Patented Oct. 11, 1932

1,881,742

UNITED STATES PATENT OFFICE

LEON LILIENFELD, OF VIENNA, AUSTRIA

PROCESS FOR THE MANUFACTURE OF ARTIFICIAL THREADS

No Drawing. Application filed May 29, 1929, Serial No. 367,149, and in Austria August 1, 1928.

In my United States Patent No. 1,683,199 dated Sept. 4th 1928 and allowed on application Ser. No. 156,751 filed Dec. 23rd 1926, (reissued as No. 18,170) a process for the preparation of artificial threads of high dry tenacity of over 2 grams per denier is described. According to the process of said patent viscose is brought into the form of an artificial thread and the latter brought in contact with a liquid medium which is able to coagulate viscose and to plasticize the coagulated viscose. The patent describes strong mineral acids, preferably strong sulphuric acid, as the precipitating, or coagulating, and plasticizing medium.

The discovery has now been made that artificial silk or threads of similar high dry tenacity as described above can be produced by bringing viscose into the form of an artificial thread and acting upon the so formed viscose with mineral acids or mineral acid anhydrides in a gaseous condition. Gaseous hydrochloric acid or gaseous mineral acid anhydrides, for example sulphur trioxide, sulphur dioxide, etc. may be employed as the coagulating and plasticizing agents in the practice of the present invention. The treatment of the formed viscose with the gaseous mineral acids or gaseous mineral anhydrides is preferably accomplished by squirting or extruding the viscose through suitably formed openings into a gaseous atmosphere which consists of or contains one or more gaseous mineral acids or gaseous mineral acid anhydrides. The process is also applicable in the production of other bodies by the extrusion method.

The mode of preparing the viscose, the use of additional stretch upon the formed viscose and the quenching or interruption of the action of the acid as described in my patent described above are recommended to be used in the present process. A prompt quenching or interruption of the action of the acid or acid anhydride should be produced in order that the valuable properties of the thread or film or other body extruded be not impaired or destroyed. In view of the teachings of this patent, it is not believed to be necessary to give examples of preparing the viscose, applying additional tension or stretch or the manner of quenching or interrupting the action of the acid. It is sufficient to state that the manner of practising the present process is the same as described in the above mentioned patent except that instead of a liquid bath, rooms or chambers are used containing one or more undiluted or diluted gaseous mineral acid anhydrides, for example sulphur trioxide or sulphur dioxide or a mineral acid such as hydrochloric acid. As a diluting agent, there may be selected air or carbon dioxide or an inert gas as hydrogen or nitrogen, or a gaseous hydrocarbon which does not react with the acid or anhydride used as the coagulating and plasticizing agent.

The gaseous mineral acid or anhydride may be at atmospheric pressure or above or below atmospheric pressure, during the treatment.

Sulphur trioxide may also be employed in the form of fuming sulphuric acid which latter is contained in the spinning chamber, but the fuming sulphuric acid should not be in contact with the entering and passing viscose thread.

Any free sulphur trioxide appearing at the opening or openings of the chamber may, just before the opening, be sucked off by a vacuum, or blown off by a current of air or of an inert gas and, if desired, then collected in its gaseous form or (for instance by cooling the receiver) in crystalline form.

Sulphur trioxide may further be used also in the form of a solution in an inert organic medium.

The expression "gaseous mineral acid" occurring in the following claims is used in the sense of including both gaseous mineral acids and gaseous mineral acid anhydrides and by the use of the said expression I intend to claim and do claim both gaseous mineral acids and gaseous mineral acid anhydrides.

I claim:—

1. The process for the manufacture of artificial threads of high dry tenacity exceeding two grams per denier which comprises coagulating a thread of viscose by means of a gaseous mineral acid.

2. The process for the manufacture of artificial threads of high dry tenacity exceeding two grams per denier which comprises coagulating a thread-like stream of viscose by passing it into an atmosphere containing a plurality of gaseous mineral acids.

3. In the manufacture of artificial threads, the herein described process which comprises continuously forming viscose into continuous threads and passing such threads through an atmosphere containing a substantial amount of a gaseous mineral acid.

4. In the manufacture of artificial silk, the herein described process which comprises continuously forming viscose into continuous threads and passing such threads through an atmosphere containing an oxide of sulphur as its principal active constituent.

5. The process for the manufacture of artificial threads of high dry tenacity exceeding two grams per denier which comprises coagulating a thread-like stream of viscose by passing it into an atmosphere consisting largely of a gaseous mineral acid.

6. The process for the manufacture of artificial extruded bodies of high dry tenacity exceeding two grams per denier which comprises coagulating an extruded body of viscose by means of a gaseous mineral acid.

7. The process for the manufacture of artificial extruded bodies of high dry tenacity exceeding two grams per denier which comprises coagulating an extruded structure of viscose by passing it into an atmosphere containing a plurality of gaseous mineral acids.

8. In the manufacture of artificial threads, the herein described process which comprises continuously forming viscose into continuous threads and passing such threads through an atmosphere containing a substantial amount of at least one substance selected from the herein described group consisting of sulphur dioxide, sulphur trioxide and hydrochloric acid gas.

9. A process of producing artificial materials having a high tenacity which comprises forming viscose as a continuous shaped body and bringing the same into an atmosphere containing a substantial percentage of at least one substance selected from the herein described group consisting of sulphur trioxide, sulphur dioxide and hydrochloric acid gas.

In testimony whereof I affix my signature.

LEON LILIENFELD.